United States Patent
Goyal et al.

(10) Patent No.: US 8,818,427 B1
(45) Date of Patent: Aug. 26, 2014

(54) MANAGING ALLOCATION OF SUBFRAMES FOR RELAY COMMUNICATION

(71) Applicant: Sprint Spectrum L.P., Overland Park, KS (US)

(72) Inventors: Anoop K. Goyal, Overland Park, KS (US); Jasinder P. Singh, Olathe, KS (US); Sandeep Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 128 days.

(21) Appl. No.: 13/645,028

(22) Filed: Oct. 4, 2012

(51) Int. Cl.
*H04W 68/00* (2009.01)
(52) U.S. Cl.
USPC .......................................................... 455/458
(58) Field of Classification Search
USPC .......................................................... 455/458
See application file for complete search history.

(56) References Cited

U.S. PATENT DOCUMENTS

| 2010/0120442 | A1 | 5/2010 | Zhuang et al. | |
|---|---|---|---|---|
| 2011/0317614 | A1* | 12/2011 | Park et al. | 370/315 |
| 2011/0317641 | A1* | 12/2011 | Noh et al. | 370/329 |
| 2012/0054258 | A1 | 3/2012 | Li et al. | |

OTHER PUBLICATIONS

S. Roth, et al., "Subfram Allocation for Relay Networks in the LTE Advanced Standard," 21st Annual IEEE International Symposium on Personal, Indoor and Mobile Radio Communications, pp. 1758-1763, 2010.

* cited by examiner

*Primary Examiner* — Joel Ajayi

(57) ABSTRACT

A method and corresponding system to help manage allocation of subframes for relay communication. The allocation may alternate or rotate between which subframes per cycle are used for backhaul communication and which subframes per cycle are used for access communication. By changing the allocation of one or more subframes per cycle between backhaul and access, it becomes possible to only tentatively take away certain subframes of access communication, while reverting to use those subframes for access communication perhaps as soon as the next cycle.

20 Claims, 6 Drawing Sheets

MANAGING ALLOCATION OF SUBFRAMES FOR RELAY COMMUNICATION

BACKGROUND

Unless otherwise indicated herein, the materials described in this section are not prior art to the claims and are not admitted to be prior art by inclusion in this section.

A typical cellular wireless communication system provides numerous wireless coverage areas in which served user equipment (UE) devices can operate. Each wireless coverage area is defined by radio frequency radiation from a respective cellular base station, and each base station, together with additional network infrastructure, may provide connectivity with one or more transport networks such as the public switched telephone network (PSTN) and the Internet. With this arrangement, a UE that is positioned within a given wireless coverage area may be served by the base station defining that coverage area and may thereby engage in communication, via that base station and perhaps additional network infrastructure, with one or more other UEs, network servers, and other entities.

In an ideal arrangement, the base stations of a cellular wireless system would provide seamless coverage throughout a region, so that UEs being served by the system could move from coverage area to coverage area without losing connectivity. In practice, however, it may not be possible to operate a sufficient number of base stations or to position the base stations in locations necessary to provide seamless coverage. As a result, there may be holes in coverage.

One way to help to solve this problem is to install a wireless relay that extends the range of a base station's coverage area so as to partially or completely fill a coverage hole. Such a relay may be configured with a wireless backhaul interface for communicating with the base station in much the same way a UE does, and a wireless access interface for communicating with and serving one or more UEs in much the same way that a base station does. Further, the relay may include control logic for actively bridging the backhaul communications with the access communications. The relay may thus receive and recover downlink communications from the base station and transmit those communications to the UEs, and receive and recover uplink communications from UEs and transmit those communications to the base station.

Advantageously, a relay like this can have a relatively small form factor, with antenna height lower than the base station and with reduced transmit power requirements. Consequently, a cellular wireless service provider may conveniently employ such relays throughout a region to efficiently fill coverage holes and help improve service quality.

OVERVIEW

In certain relay implementations, the wireless backhaul communication between the relay and the base station may share an air interface resource with the wireless access communication between the relay and one or more served UEs. For instance, the wireless backhaul communication and wireless access communication may both occur on the same carrier frequency or other common communication channel.

With such an arrangement, if the backhaul communication and access communication occur at the same time, interference may result. Therefore, it would be preferable to separate the backhaul communication from the access communication over time. For instance, if the air interface is divided into a sequence of timeslots, an improved arrangement could multiplex the backhaul communications with the access communications by allocating certain timeslots for the backhaul communications and allocating other time slots for the access communications.

Unfortunately, however, allocating timeslots in this manner may give rise to yet another issue. Namely, if certain timeslots are reserved to carry backhaul communications between the base station and the relay and are thus not available to carry access communications between the relay and served UEs, essentially half of the air interface capacity on the access side may be eliminated. Consequently, the relay may be limited to serving fewer UEs, or the service level of UEs in the relay's coverage may be reduced.

This issue becomes even more significant in a system that normally uses certain air interface timeslots to carry important control messages such as page messages for instance. In a system operating according to the well-known Long Term Evolution (LTE) protocol, for example, the downlink air interface is divided into a sequence of 1 millisecond subframes that may be grouped into repeated cycles, such as 1.28 second cycles each including 1,280 subframes, and certain subframes in each cycle may be designated as paging subframes or "paging occasions" in which the LTE base station may transmit page messages to served UEs. In practice, page messages destined to a particular UE may then be transmitted in a particular one of those paging subframes selected based on an algorithmic hashing process keyed to the UE's identifier, and the UE may thus read that particular subframe per cycle to obtain any such page messages.

With such an arrangement, if any of the subframes that are allocated for backhaul communication are paging subframes, a UE that would normally receive page messages in that subframe would not receive page messages. Consequently, the UE may be unable to receive incoming calls and text messages and may otherwise suffer from degraded performance.

Disclosed herein is a method and corresponding system to help overcome this problem. In accordance with the disclosure, the system may be arranged to alternate or rotate between which subframes per cycle are used for backhaul communication and which subframes per cycle are used for access communication. By changing the allocation of one or more subframes per cycle between backhaul and access, it becomes possible to only tentatively take away certain subframes of access communication, while reverting to use those subframes for access communication perhaps as soon as the next cycle. For instance, although a subframe that would normally carry page messages for a given UE would be eliminated from access communication during one cycle, that subframe may be used for access communication during the very next cycle. Thus, although the UE may have a one cycle delay before receiving a page message, the UE could still ultimately receive the page message.

Accordingly, in one respect, the disclosed method may involve using a common air interface resource for both backhaul communication between a donor base station and a relay base station and access communication between the relay base station and one or more UEs. The common air interface resource may be divided over time into a sequence of subframes each being used for either the backhaul communication or the access communication, and the sequence of subframes may be grouped into repeated cycles of P subframes each, with the Nth subframe per cycle being usable as a paging subframe for carrying page messages for the access communication. The method may then involve, in a given one of the cycles, using the Nth subframe for the backhaul communication but not for the access communication, and in a next one of the cycles after the given cycle, using the Nth subframe for the access communication but not for the backhaul communication.

In another respect, the disclosed method may method similarly involve using a common air interface resource for both backhaul communication between a donor base station and a relay base station and access communication between the relay base station and one or more UEs. Further, the common air interface resource may be divided over time into a sequence of subframes each being used to carry either the backhaul communication or the access communication, and the sequence of subframes may be grouped into repeated cycles of P subframes each. In each cycle, a particular group of the subframes may then be usable as paging subframes for the access communication, with the particular group of subframes being the same subframes in each cycle. The method may then involve (i) in a given one of the cycles, using a particular subframe of the group for the backhaul communication instead of for the access communication, and using each other subframe of the group for the access communication, and (ii) in a next one of the cycles after the given cycle, using a different subframe of the group for the backhaul communication instead of for the access communication, and using each other subframe of the group for the access communication.

Still further, in another respect, the disclosed system may include a relay base station having a wireless communication module (e.g., one or more wireless communication interfaces) for engaging in backhaul communication with a donor base station and access communication with one or more UEs, with the backhaul communication and access communication occurring on a shared air interface resource that defines a sequence of subframes grouped over time into successive cycles, and with each subframe being used for either the backhaul communication or the access communication. The relay base station may then include a processing unit, data storage, and program logic stored in the data storage and executable by the processing unit to manage allocation of the subframes between the backhaul communication and the access communication. In particular, the program logic may be executable to carry out functions that include (i) in a given cycle of the cycles, allocating one or more particular subframes to use for the backhaul communication and not for the access communication and (ii) in a next cycle of the cycles, allocating the one or more particular subframes to use for the access communication and not for the backhaul communication.

These as well as other aspects, advantages, and alternatives will become apparent to those of ordinary skill in the art by reading the following detailed description, with reference where appropriate to the accompanying drawings. Further, it should be understood that this overview and the other description provided throughout this document is provided to explain the invention by way of example and is not intended to be limiting.

DETAILED DESCRIPTION

Figure 1:
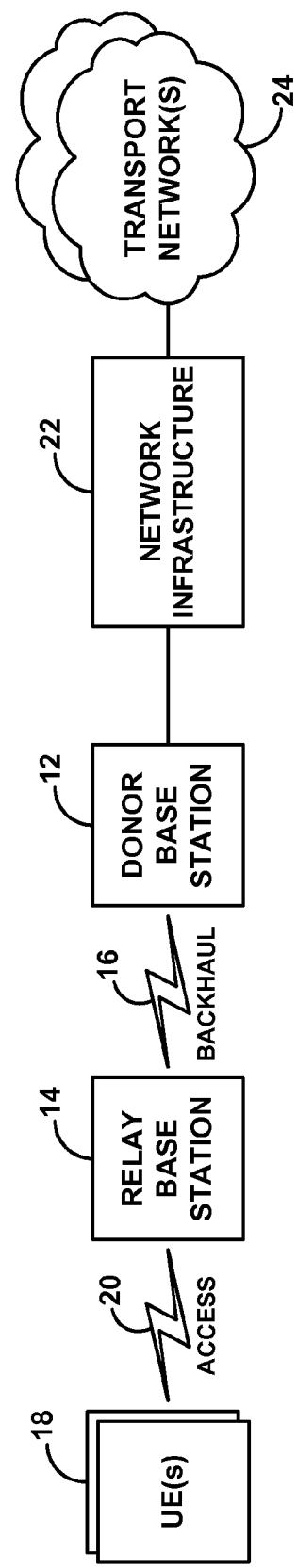
FIG. 1 is a simplified block diagram of a wireless communication system in which the present method can be implemented.

Referring to the drawings, as noted above, FIG. 1 is a simplified block diagram of a wireless communication system in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the representative wireless communication system includes a primary or donor base station 12 serving a relay base station 14 via a backhaul air interface 16, and the relay base station 14 then serving one or more UEs 18 via an access air interface 20. Further, base station 12 is shown coupled with network infrastructure (such as a switch, gateway, mobility manager, or the like) 22, which provides connectivity or facilitates communication with one or more transport networks 24 such as the PSTN or the Internet for instance.

With this arrangement, control and bearer data may pass in the downlink direction from the donor base station 12 to the relay base station 14 and in turn from the relay base station to a served UE 18, and control and bearer data may likewise pass in the uplink direction from a served UE to the relay base station and in turn to the donor base station. For example, when a UE enters coverage of the relay base station 14, the UE may register with the relay base station via the access interface 20, and the relay base station may correspondingly register the UE with the donor base station via the backhaul interface 16. Thereafter, when the donor base station seeks to transmit a page message to the UE, the donor base station may transmit the page message to the relay base station via the backhaul interface, and the relay base station may then transmit the page message to the UE via the access interface in a paging subframe that the UE would be arranged to read. Likewise, when the UE engages in active bearer communication (e.g., wireless packet data communication), bearer data may flow between the UE and the relay base station via the access interface and via the relay base station and the donor base station via the backhaul interface.

Figure 2:
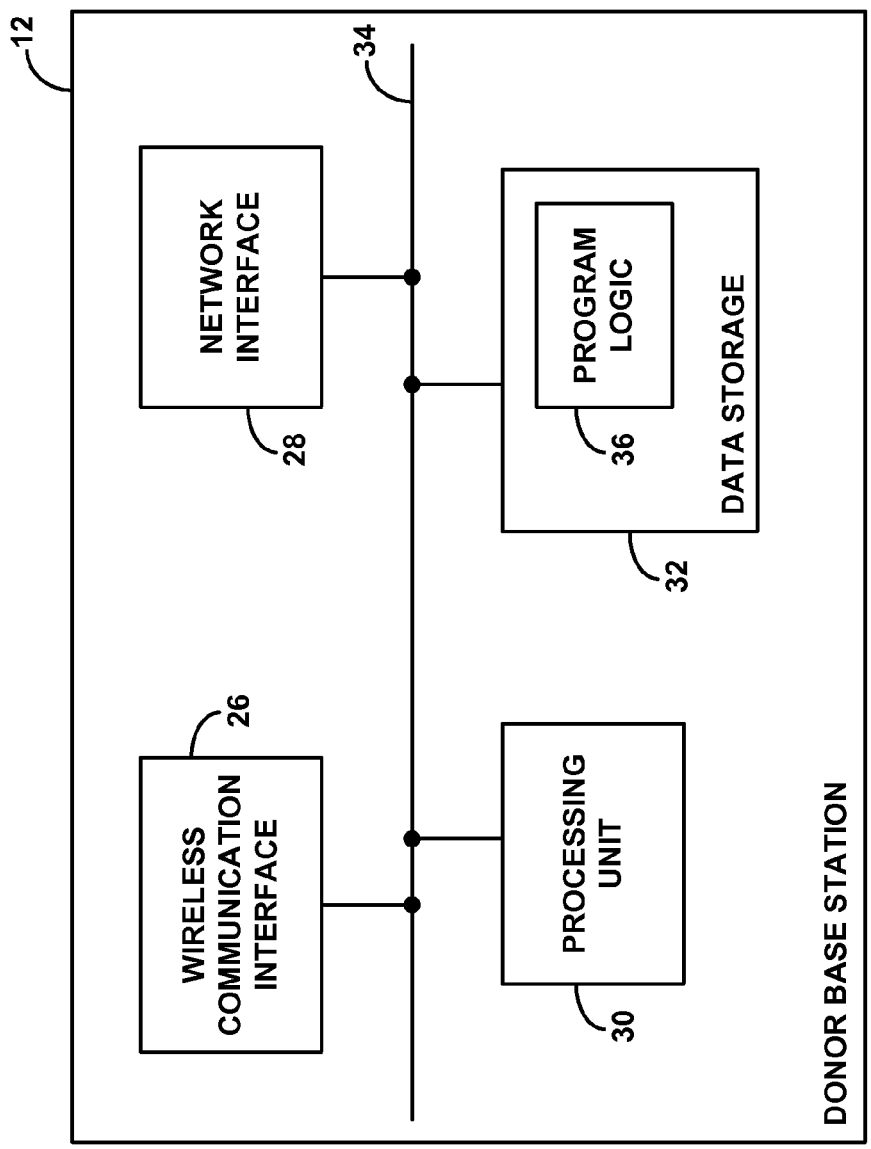
FIG. 2 is a simplified block diagram of a donor base station operable in the arrangement of FIG. 1.

FIG. 2 is next a simplified block diagram of a representative donor base station 12, such as a base transceiver station, access node, access point, Node-B, or eNodeB, for instance (whether macro, femto or the like), illustrating some of the components that can be included in such an entity. As shown in FIG. 2, the representative donor base station 12 includes a wireless communication interface 26, a network interface 28, a processing unit 30, and data storage 32, all of which may be coupled together by a system bus, network or other connection mechanism 34.

Wireless communication interface 26 may function to engage in air interface communication with served devices, such as the relay base station 14 and UEs in more direct wireless communication with the donor base station 12. As such, the wireless communication interface 26 may comprise an antenna arrangement (not shown), which may be tower mounted, and associated components such as a power amplifier and a cell site modem (not shown), so as to transmit and receive bearer and control data. Network interface 28 may then comprise a wired or wireless interface for communicating with the network infrastructure 22 for instance.

Processing unit 30 may then comprise one or more general purpose processors (e.g., microprocessors) and/or one or more special-purpose processors (e.g., digital signal processors and/or application specific integrated circuits) and may be integrated in whole or in part with the wireless communication interface 26. And data storage 32 may comprise one or more volatile and/or non-volatile storage components, such as magnetic, optical, flash, or other types of non-transitory computer readable media, and may be integrated in whole or in part with processing unit 30.

As shown, data storage 32 may store program logic (e.g., machine language instructions) 36, which may be executable by processing unit 30 to carry out various donor base station functions described herein. For instance, the program logic 36 may be executable to cause the donor base station to interwork with the relay base station 14 so as to help provide the dynamic subframe allocation of the present method.

Figure 3:
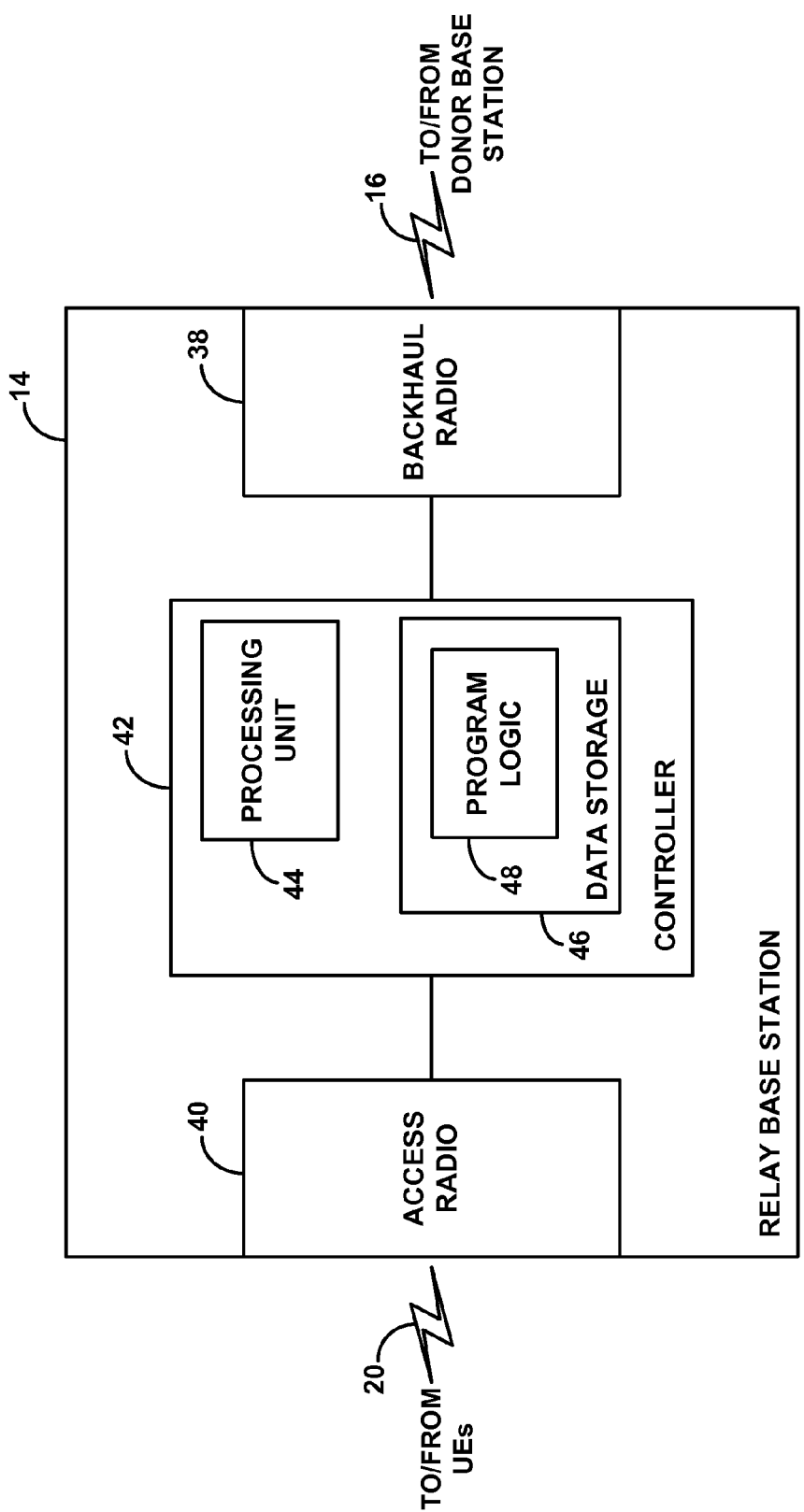
FIG. 3 is a simplified block diagram of a relay base station operable in the arrangement of FIG. 1.

FIG. 3 is next a simplified block diagram depicting a representative relay base station 14, illustrating some of the components that can be included in such an entity. As shown, the representative relay base station 14 includes a wireless communication module comprising a backhaul radio 38 and an access radio 40, and a controller 42 for bridging communications between the backhaul radio and access radio.

Although the figure depicts these components as discrete blocks, the components may be integrated together in various ways or provided in other forms. For instance, the backhaul radio 38 and access radio 40 may be integrated together, perhaps on a single chipset. Further, the controller 42 may be integrated with either or both of the radios. Still further, although the figure depicts the controller with direct links to each of the radios, in an alternative arrangement the relay base station may include a system bus, network, or other connection mechanism to which the radios and controller may be communicatively linked. Other arrangements are possible as well.

In the illustrated relay base station, the backhaul radio 38 may function to engage in backhaul wireless communication with donor base station 12 via the backhaul air interface 16. To facilitate this, backhaul radio 38 may be largely the same type of radio that would be included in a UE designed to be served by a base station. The backhaul radio 38 may thus include an antenna arrangement (not shown) and associated components to facilitate transmitting and receiving bearer and control data in communication with the donor base station 12.

The access radio 40, on the other hand, may function to engage in access wireless communication with the one or more UEs 18. To facilitate this, the access radio 40 may be largely the same type of radio that would be included in a donor base station designed to serve such UEs. The access radio 40 may thus include an antenna arrangement (not shown) and associated components to facilitate transmitting and receiving bearer and control data in communication with the one or more UEs 18.

Controller 42, in turn, may function to actively bridge communications of the backhaul radio 38 with communications of the access radio 40, and thus to bridge backhaul wireless communications between the donor base station 12 and the relay base station 14 with access wireless communications between the relay base station 14 and the served UEs 18. As such, as backhaul radio 38 receives downlink communications from the donor base station 12, controller 42 may receive those communications from the backhaul radio and may then pass the communications to the access radio 40, and the access radio 40 may transmit the communications to served UEs 18. Likewise, as access radio 40 receives uplink communications from served UEs 18, controller 42 may receive those communications from the access radio and may then pass the communications to the backhaul radio 38, and the backhaul radio may then transmit the communications to the donor base station 12.

In the example arrangement shown, controller 42 includes a processing unit 44 and data storage 46. Processing unit 44 may comprise one or more general purpose processors (e.g., microprocessors) and/or one or more special purpose processors (e.g., digital signal processors and/or application specific integrated circuits). And data storage 46 may comprise one or more volatile and/or non-volatile storage components, such as magnetic, optical, flash, or other types of non-transitory computer readable media, and may be integrated in whole or in part with processing unit 44.

As shown, data storage 46 may store program logic (e.g., machine language instructions) 48, which may be executable by processing unit 44 to carry out various relay base station functions described herein. For instance, the program logic 48 may be executable to cause the relay base station to interwork with the donor base station 12 so as to help provide the dynamic subframe allocation of the present method.

In practice, in the arrangement of FIG. 1, backhaul interface 16 and access interface 20 may share a common air interface resource and use a common air interface protocol. By way of example, the common air interface resource may be a particular carrier frequency band, such as a particular 5 MHz frequency band for instance, and the common air interface protocol may be LTE. In alternative arrangements, however, the system may use another common air interface resource and/or another air interface protocol, examples of which include CDMA (e.g., 1xRTT or 1xEV-DO), WiMAX, IDEN, GSM, GPRS, UTMS, EDGE, MMDS, WIFI, and BLUETOOTH.

Depending on the air interface protocol in use, the downlink and uplink may have a frequency division duplex (FDD) arrangement in which the downlink uses a different carrier frequency than the uplink, or a time division duplex (TDD) arrangement in which the downlink and uplink share the same carrier frequency but are separated from each other in time. For simplicity, the present discussion will focus on the FDD arrangement and specifically on management of subframes on the downlink. However, it will be understood that principles of the present method can apply as well in a TDD arrangement and/or with respect to particular subframes on the uplink.

As discussed above, a representative downlink LTE air interface is divided into 1 millisecond subframes that are grouped into repeated cycles of 1,280 subframes, and certain ones of the subframes per cycle are designated as paging frames for carrying page messages to UEs. More particularly, each cycle is 1.28 seconds long and is divided into 128 frames that are each 10 milliseconds long, and each frame is then divided into 10 subframes that are each 1 millisecond long. Within each frame, certain ones of the subframes are then designated as paging subframes, in that those subframes may be used to carry page messages to particular UEs (but may also be used for other purposes). In an example implementation, for instance, if the subframes of each frame are numbered 0 through 9, subframe numbers 0, 4, 5, and 9 may each be designated as paging subframes.

In practice, when a UE is idling in an LTE coverage area, the UE may operate in a low power mode and may wake up every 1.28 seconds (or other defined cycle period) to check for any page messages destined to the UE. If the UE detects a page message, the UE may then process the page message. For example, the page message may alert the UE of an incoming call, in which case the UE may respond to the page message to facilitate receiving the call. Other examples are possible as well.

As noted above, a hashing algorithm will establish which particular subframe per 1.28 second cycle would be used to carry page messages to a given UE, and thus which subframe per 1.28 second cycle the UE should wake up to read. In particular, the hashing algorithm may establish which of the 128 frames in the cycle would be used to carry page messages to the UE, and which of the paging subframes in that frame would be used to carry page messages to the UE. Both the serving LTE base station (eNodeB) and the UE would apply this hashing algorithm, so that the base station can transmit a page message to the UE in the appropriate subframe and the UE can wake up to read that particular subframe to receive the transmitted page message.

In a representative paging process, when a base station has a page message to transmit to a UE, the base station may engage in up to a certain number of attempts to page the UE before deeming the paging effort to have failed. In particular, the base station may first page the UE in a given cycle, transmitting the page message in the subframe that the UE would be arranged to read. If the base station does not receive a response from the UE, then the base station may then page the UE in the next cycle, again transmitting the page message in the subframe that the UE would be arranged to read. By way of example, after three such attempts, the base station may then conclude that the paging effort failed.

As explained above, when a relay base station is implemented as in FIG. 1, certain ones of the subframes per cycle may be allocated for use to carry backhaul communication from the donor base station 12 to the relay base station 14, with the other subframes per cycle being allocated for use to carry access communication from the relay base station 14 to served UEs 18. In particular, the donor base station 12 and relay base station 14 may be programmed to apply such an allocation, so as to help prevent backhaul and access communication from occurring simultaneously on the shared air interface resource.

Considering that particular ones of the LTE downlink subframes are designated for use to carry page messages, one option would be to allocate all of the paging subframes for the access communication, so that the relay base station can successfully transmit page messages to the appropriate UEs. A problem with this allocation, however, is that subframes that would be used for the backhaul communication would be the subframes that could otherwise carry bearer data on the access interface to served UEs. Using principally those subframes for backhaul communication could thus significantly reduce the available bearer capacity of the access interface.

According to the present method, an improved solution is to allocate certain paging subframes for use to carry backhaul communication, but to vary which paging subframes are allocated from cycle to cycle, so as to only tentatively remove a given paging subframe from the access interface. The variation in which paging subframes are allocated for backhaul communication versus access communication may provide for alternating on a cycle by cycle basis and/or rotating through allocation of particular paging subframes for backhaul communication.

For example, given a particular number of paging subframes per cycle, the paging subframes could be divided into two groups A and B, and the allocation may alternate from cycle to cycle between (a) using the paging subframes of group A for access communication (as paging subframes) and the paging subframes of group B for backhaul communication and (b) using the paging subframes of group B for access communication (as paging subframes) and the paging subframes of group A for backhaul communication. Further, as a variation on this example, one of the two groups could consist of all of the paging subframes, and the other group could consist of none of the paging subframes, in which case the allocation may alternate on a per cycle basis between (a) using all of the paging subframes for backhaul communication rather than for access communication and (b) using all of the paging subframes for access communication rather than for backhaul communication.

Figure 4:
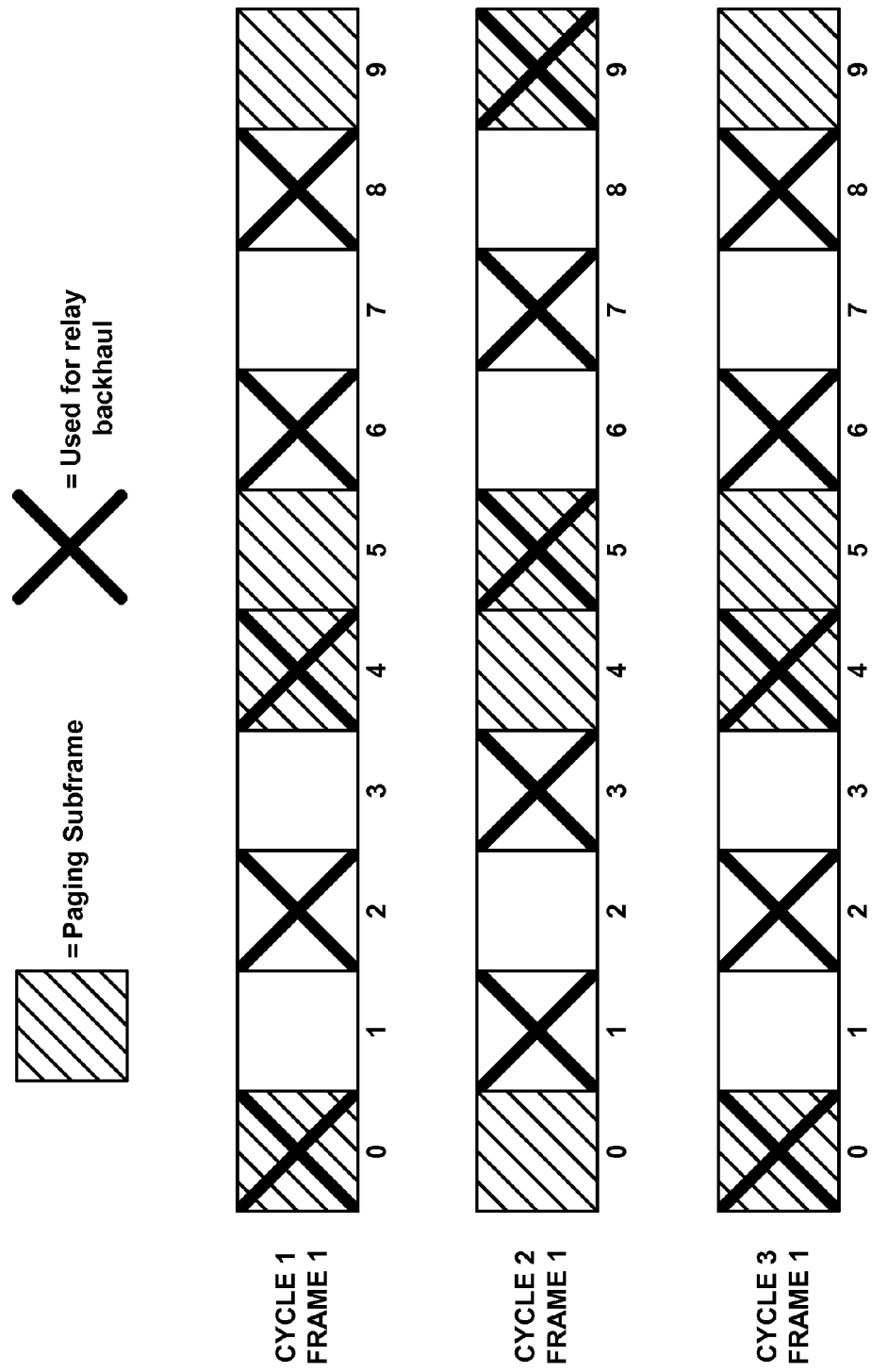
FIG. 4 is a diagram of a portion of successive downlink cycles, showing an example variation in allocation of subframes from cycle to cycle.

As another example, the paging subframes could be divided into three groups A, B, and C, and the allocation may rotate through those groups, (a) in a first cycle, using the paging subframes of group A for backhaul communication and the paging subframes of groups B and C for access communication, (b) in a next cycle, using the paging subframes of group B for backhaul communication and the paging subframes of groups A and C for access communication, and (c) in a next cycle, using the paging subframes of group C for backhaul communication and the paging subframes of groups A and B for access communication. To help illustrate this dynamic allocation process, FIG. 4 depicts three instances of the same 10 millisecond frame from sequential 1.28 cycles of the LTE downlink. For example, of the 128 frames per cycle, the illustrated frame may be the first frame in each of a series of sequential cycles 1, 2, and 3, and may thus include subframes 0 through 9 of the 1,280 subframes in each cycle. In each of these frames, subframes 0, 4, 5, and 9 are shaded to indicate that they are paging subframes, meaning that they can be used to carry page messages to UEs on the access interface. Further, certain subframes are marked with a bold X to indicate that the subframes are allocated for backhaul communication rather than for access communication, with the other subframes being allocated for access communication rather than for backhaul communication.

In the example of FIG. 4, in cycle 1, just subframes 0, 2, 4, 6, and 8 are allocated for backhaul communication, and thus paging subframes 0 and 4 are allocated for backhaul communication but paging subframes 5 and 9 are available for use as paging subframes on the access interface. In cycle 2, just subframes 1, 3, 5, 7, and 9 are allocated for backhaul communication, and thus paging subframes 5 and 9 are allocated for backhaul communication but paging subframes 0 and 4 are available for use as paging subframes on the access interface. And in cycle 3, the allocation alternates back to what it was in cycle 1. This alternating of the subframe allocation may continue similarly in subsequent cycles, or may vary still further in other cycles.

With this example, the donor base station 12 and the relay base station 14 may be programmed to apply the alternating allocation of FIG. 4, so as to automatically switch the subframe on a per cycle basis. In particular, the both the donor base station and the relay base station would be programmed to engage in downlink backhaul communication with each other in the subframes that the figure marks with the bold X, and the relay base station would be programmed to engage in downlink access communication in the subframes that the figure does not mar, with the bold X.

With this arrangement, the impact on paging a UE may be minimal.

For instance, consider a UE that would normally be paged in subframe 5. Further, assume that in cycle 1, the donor base station 12 has a page message for the UE and transmits the page message to the relay base station 14 for transmission in turn to the UE. In particular, during cycle 1, the donor base station 12 may transmit the page message to the relay base station 14 in one of the subframes allocated for backhaul communication. Assuming frame 1 has passed by this time, the relay base station would then aim to page the UE in the next instance of subframe 5.

In cycle 2 as shown in FIG. 4, however, the relay base station 14 may avoid transmitting on the access interface during subframe 5, since that subframe is allocated in cycle 2 for backhaul communication. During cycle 2, when the UE wakes up and checks subframe 5 for a page message, the UE may not detect any relevant transmission. Thus, the UE would not receive the page message in cycle 2. However, in cycle 3, subframe 5 would then be used for access communication rather than for backhaul communication, and the relay base station 14 would thus transmit the page message for the UE in subframe 5 of cycle 3. When the UE wakes up in cycle 3 and checks subframe 5 for a page message, the UE may thus find the page message and respond accordingly.

At worst in this process, the paging of the UE may thus be delayed possibly by one or two 1.28 second cycles. However, due to the variation in subframe allocation from cycle to cycle, paging could still ultimately succeed.

Figure 5:
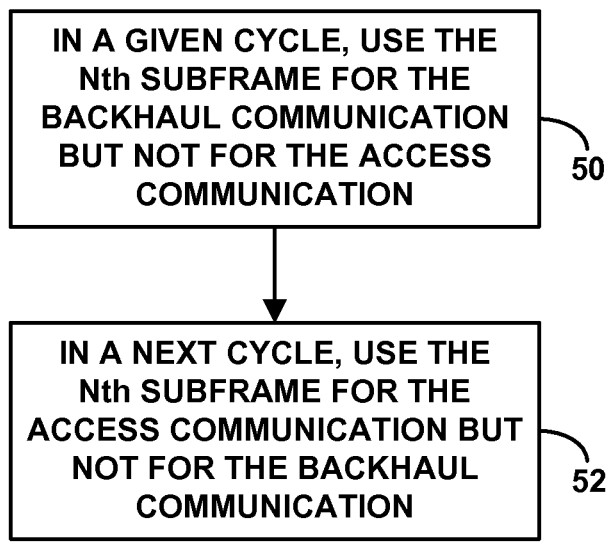
FIG. 5 is a flow chart depicting functions that can be carried out in accordance with the present method.

FIG. 5 is next a flow chart depicting functions that can be carried out in accordance with the present method. In line with the discussion above, the method of FIG. 5 assumes that a common air interface resource is being used for both backhaul communication between a donor base station and a relay base station and access communication between the relay base station and one or more UEs. Further, the method assumes that the common air interface resource is divided over time into a sequence of subframes each being used for either the backhaul communication or the access communication, and that the sequence of subframes is grouped into repeated cycles of a particular number of subframes each, with Nth subframe per cycle being usable as a paging subframe for carrying page messages for the access communication. For instance, the Nth subframe may be the subframe that is to be used for carrying page messages to a particular idle UE, such as subframe 5 in the discussion above.

As shown in FIG. 5, at block 50, the method may then involve, in a given one of the cycles, using the Nth subframe for the backhaul communication but not for the access communication. In turn, at block 52, the method may then involve, in a next one of the cycles after the given cycle, using the Nth subframe for the access communication but not for the backhaul communication. By executing program logic, the donor base station and relay base station may thus automatically switch the allocation of the Nth subframe between backhaul communication and access communication on a per cycle basis.

Further in line with the discussion above, we can assume that the Mth subframe per cycle is usable as a paging subframe for carrying page messages for the access communication. For instance, the Mth subframe may be the subframe that is to be used for carrying page messages to another idle UE, such as subframe 4 in the discussion above. The method may then further involve, in the given cycle, using the Mth subframe for the access communication but not for the backhaul communication, and in the next cycle, using the Mth subframe for the backhaul communication but not for the access communication. Further, the method may then involve continuing to alternate, on a per cycle basis, between (i) using the Nth subframe for the backhaul communication and not for the access communication and using the Mth subframe for the access communication and not for the backhaul communication and (ii) using the Nth subframe for the access communication and not for the backhaul communication and using the Mth subframe for the backhaul communication and not for the access communication.

Figure 6:
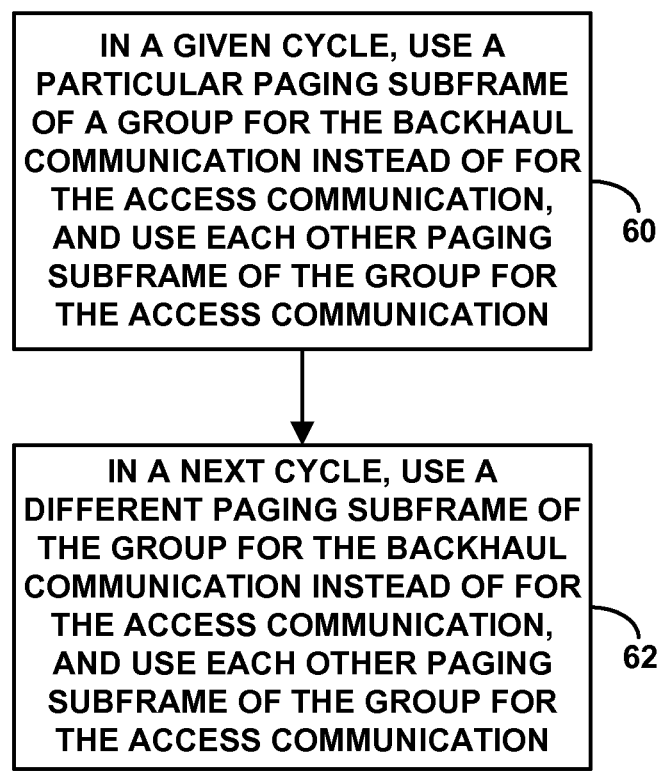
FIG. 6 is a flow chart depicting functions that can be carried out in accordance with the present method.

FIG. 6 is next another flow chart depicting functions that can be carried out in accordance with the present method. In line with the discussion above as well, the method of FIG. 6 assumes that a common air interface resource is being used for both backhaul communication between a donor base station and a relay base station and access communication between the relay base station and one or more UEs. Further, the method assumes that the common air interface resource is divided over time into a sequence of subframes each being used for either the backhaul communication or the access communication, and that the sequence of subframes is grouped into repeated cycles of subframes. And the method assumes that in each cycle, a particular group of subframes are usable as paging subframes for the access communication, the particular group being the same subframes in each cycle. The group may be defined to be all possible paging subframes or just a proper subset of the possible paging subframes.

As shown in FIG. 6, at block 62, the method may then involve, in a given one of the cycles, using a particular subframe of the group for the backhaul communication instead of for the access communication, and using each other subframe of the group for the access communication. In turn, at block 62, the method may then involve in a next one of the cycles after the given cycle, using a different subframe of the group for the backhaul communication instead of for the access communication, and using each other subframe of the group for the access communication. By executing program logic, the donor base station and relay base station may thus automatically switch between using the particular subframe of the group for backhaul communication in the given cycle and using the different subframe of the group for backhaul communication in the next cycle. Further, the donor base station and relay base station may then continue to vary on a per cycle basis which subframes are used for the backhaul communication and which subframes are used for the access communication.

Exemplary embodiments have been described above. Those of ordinary skill in the art will appreciate, however, that numerous changes to the embodiments described can be made without deviating from the basic principles of the invention.

We claim:

1. A method comprising:
using a common air interface resource for both backhaul communication between a donor base station and a relay base station and access communication between the relay base station and one or more user equipment (UE) devices, the common air interface resource being divided over time into a sequence of subframes each being used for either the backhaul communication or the access communication, wherein the sequence of subframes is grouped into repeated cycles of a particular number of subframes each, and the Nth subframe per cycle is usable as a paging subframe for carrying page messages for the access communication;
in a given one of the cycles, using the Nth subframe for the backhaul communication but not for the access communication; and
in a next one of the cycles after the given cycle, using the Nth subframe for the access communication but not for the backhaul communication.

2. The method of claim 1, wherein an idle UE reads the Nth subframe per cycle to determine whether that Nth subframe carries a page message for the idle UE.

3. The method of claim 1, the Mth subframe per cycle is also usable as a paging subframe for carrying page messages, the method further comprising:
in the given cycle, using the Mth subframe for the access communication but not for the backhaul communication; and
in the next cycle, using the Mth subframe for the backhaul communication but not for the access communication.

4. The method of claim 3,
wherein a first idle UE reads the Nth subframe per cycle to determine whether that Nth subframe carries a page message for the first idle UE, and
wherein a second idle UE reads the Mth subframe per cycle to determine whether that Mth subframe carries a page message for the second idle UE.

5. The method of claim 3, further comprising:
continuing to alternate, on a per cycle basis, between (i) using the Nth subframe for the backhaul communication and not for the access communication and using the Mth subframe for the access communication and not for the backhaul communication and (ii) using the Nth subframe for the access communication and not for the backhaul communication and using the Mth subframe for the backhaul communication and not for the access communication.

6. The method of claim 1, further comprising executing program logic, by the donor base station and the relay base station, to automatically switch between using the Nth subframe of the given cycle for the backhaul communication and using the Nth subframe of the next cycle for the access communication.

7. The method of claim 1, wherein the common air interface resource comprises a common frequency channel.

8. The method of claim 1, wherein the backhaul communication and the access communication are both downlink communication.

9. A relay base station comprising:
a wireless communication module for engaging in backhaul communication with a donor base station and access communication with one or more user equipment (UE) devices, wherein the backhaul communication and access communication occur on a shared air interface resource defining a sequence of subframes grouped over time into successive cycles, and wherein each subframe is used for either the backhaul communication or the access communication;
a processing unit;
data storage; and
program logic stored in the data storage and executable by the processing unit to manage allocation of the subframes between the backhaul communication and the access communication, including carrying out functions comprising (i) in a given cycle of the cycles, allocating one or more particular subframes to use for the backhaul communication and not for the access communication and (ii) in a next cycle of the cycles, allocating the one or more particular subframes to use for the access communication and not for the backhaul communication.

10. The relay base station of claim 9, wherein the one or more particular subframes comprise at least one subframe usable as a paging subframe to page a given UE of the one or more UEs.

11. The relay base station of claim 9, wherein the common air interface resource comprises a common frequency channel.

12. The relay base station of claim 9, wherein the backhaul communication and the access communication are both downlink communication.

13. The relay base station of claim 9, wherein the functions further comprise continuing to vary on a per cycle basis which subframes are used for the backhaul communication and which subframes are used for the access communication.

14. A method comprising:
using a common air interface resource for both backhaul communication between a donor base station and a relay base station and access communication between the relay base station and one or more user equipment (UE) devices, the common air interface resource being divided over time into a sequence of subframes each being used to carry either the backhaul communication or the access communication, wherein the sequence of subframes is grouped into repeated cycles of subframes, and in each cycle, a particular group of subframes are usable as paging subframes for the access communication, wherein the particular group of subframes is the same subframes in each cycle; and
in a given one of the cycles, using a particular subframe of the group for the backhaul communication instead of for the access communication, and using each other subframe of the group for the access communication; and
in a next one of the cycles after the given cycle, using a different subframe of the group for the backhaul communication instead of for the access communication, and using each other subframe of the group for the access communication.

15. The method of claim 14, further comprising executing program logic, by the donor base station and the relay base station, to automatically switch between using the particular subframe of the group for the backhaul communication in the given cycle and using the different subframe of the group for the backhaul communication in the next cycle.

16. The method of claim 14, wherein the common air interface resource comprises a common frequency channel.

17. The method of claim 14, wherein the common air interface resource comprises a common Long Term Evolution frequency channel.

18. The method of claim 14, wherein the backhaul communication and the access communication are both downlink communication.

19. The method of claim 14, wherein each cycle is 1.28 seconds long and includes 128 frames, and wherein each frame includes 10 of the subframes.

20. The method of claim 14, further comprising continuing to vary on a per cycle basis which subframes are used for the backhaul communication and which subframes are used for the access communication.

* * * * *